(12) United States Patent
Yamashita (10) Patent No.: US 9,003,217 B2
(45) Date of Patent: Apr. 7, 2015

(54) SEMICONDUCTOR INTEGRATED CIRCUIT APPARATUS

(75) Inventor: Hajime Yamashita, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 417 days.

(21) Appl. No.: 13/585,140

(22) Filed: Aug. 14, 2012

(65) Prior Publication Data

US 2013/0054855 A1 Feb. 28, 2013

(30) Foreign Application Priority Data

Aug. 25, 2011 (JP) ................................ 2011-183805

(51) Int. Cl.
*G06F 1/00* (2006.01)
*G06F 1/32* (2006.01)

(52) U.S. Cl.
CPC ........... *G06F 1/3253* (2013.01); *Y02B 60/1235* (2013.01); *Y02B 60/32* (2013.01)

(58) Field of Classification Search
USPC .................... 710/110.302, 304; 713/324, 322
See application file for complete search history.

(56) References Cited

U.S. PATENT DOCUMENTS

| | | | | |
|---|---|---|---|---|
| 5,303,171 A * | 4/1994 | Belt et al. | | 713/321 |
| 5,390,334 A * | 2/1995 | Harrison | | 713/324 |
| 5,517,650 A * | 5/1996 | Bland et al. | | 713/323 |
| 5,898,879 A * | 4/1999 | Kim | | 713/322 |
| 5,987,614 A * | 11/1999 | Mitchell et al. | | 713/300 |
| 6,357,013 B1 * | 3/2002 | Kelly et al. | | 713/324 |
| 6,393,572 B1 * | 5/2002 | Datta et al. | | 713/322 |
| 7,069,476 B1 * | 6/2006 | Insley et al. | | 714/43 |
| 7,155,618 B2 | 12/2006 | Moyer et al. | | |
| 7,770,042 B2 * | 8/2010 | Gaskins | | 713/322 |
| 7,836,320 B2 * | 11/2010 | Harris | | 713/324 |
| 7,925,908 B2 * | 4/2011 | Kim | | 713/320 |
| 8,190,924 B2 * | 5/2012 | Henmi | | 713/300 |
| 8,312,299 B2 * | 11/2012 | Tremel et al. | | 713/300 |
| 8,407,507 B2 * | 3/2013 | Suzuki et al. | | 713/330 |
| 8,499,182 B2 * | 7/2013 | Fujigaya | | 713/323 |
| 2003/0172310 A1 * | 9/2003 | Moyer et al. | | 713/300 |
| 2004/0139018 A1 * | 7/2004 | Anderson et al. | | 705/41 |
| 2004/0215982 A1 * | 10/2004 | Subramanian et al. | | 713/300 |
| 2006/0143348 A1 * | 6/2006 | Wilson et al. | | 710/110 |
| 2014/0173307 A1 * | 6/2014 | Machnicki et al. | | 713/320 |

FOREIGN PATENT DOCUMENTS

| | | |
|---|---|---|
| JP | 2000-215157 A | 8/2000 |
| JP | 2002-7316 A | 1/2002 |
| JP | 2006-508409 A | 3/2006 |

* cited by examiner

*Primary Examiner* — Paul R Myers
(74) *Attorney, Agent, or Firm* — Foley & Lardner LLP (57) ABSTRACT

When a bus stop request control unit issues a module-specific bus stop request signal, a bus stop control unit coupled to a bus slave determines a module that serves as a bus master of the bus slave and on which the bus slave is dependent, for example, on the basis of information in a dependence setting register. The bus stop control unit then outputs a prior bus stop request signal to the module on which the bus slave is dependent, so as to stop use of a bus of the module. Upon receipt of a module-specific bus stop completion signal indicating that processing of stop of the bus of the module on which the bus slave is dependent is complete, the bus stop control unit outputs a module-specific bus stop request signal to the module which serves as a bus slave and whose bus is to be stopped.

9 Claims, 6 Drawing Sheets

SEMICONDUCTOR INTEGRATED CIRCUIT APPARATUS

CROSS-REFERENCE TO RELATED APPLICATIONS

The disclosure of Japanese Patent Application No. 2011-183805 filed on Aug. 25, 2011 including the specification, drawings and abstract is incorporated herein by reference in its entirety.

BACKGROUND

The present invention relates to a technology for stopping the bus of a module in a semiconductor integrated circuit apparatus. In particular, the invention relates to an effective technology for stopping the bus of a module to perform power saving control.

Technologies for reducing power consumption of semiconductor integrated circuit apparatuses, such as systems-on-chip (SoCs), which are widely used in mobile terminals and the like are becoming essential.

To perform power management control for power saving, a semiconductor integrated circuit apparatus of this type may cause a target module to stop using the bus, that is, may stop the bus of a module.

Such bus stop is performed by a bus stop control unit before performing power management control. For example, a handshake is performed by transmitting bus stop request signals to bus master modules (e.g., CPUs) and receiving bus stop completion signals from the bus master modules.

Upon receipt of the bus stop request signal from the bus stop control unit, each bus master module completes all bus transactions (bus requests) issued by the bus master module and then issues a bus stop completion signal. Upon receipt of the bus stop completion signals from all the bus master modules on which stop control is to be performed, the bus stop control unit issues a bus stop completion signal to a power management control unit.

Examples of this type of bus stop control technology for power saving include one which reduces power consumption of an entire computer system by dynamically stopping the bus clock or reducing the frequency thereof during operation of the computer system (Japanese Unexamined Patent Application Publication No. 2002-7316), one which gives a bus request to an arbiter in response to a determination for moving to power saving mode and disables a clock given to a bus master associated with the arbiter in response to the bus request (Japanese Unexamined Patent Application Publication (Translation of PCT Application) No. 2006-508409), and one where a master controller changes the correspondence between a bus request made by a selector and an arbitration sequencer of each priority in accordance with the value of a register (Japanese Unexamined Patent Application Publication No. 2000-215157).

SUMMARY

The inventors, however, have found that the above-mentioned technologies for controlling bus stop in a semiconductor integrated circuit apparatus have the following problems.

To stop the bus of a module serving as a bus slave, first, the bus of a module serving as a bus master is stopped by completing bus transactions issued by the bus master. The reason is that stopping the bus of the module serving as a bus slave before completing the bus transactions causes hang-up of the bus transactions issued by the bus master.

However, recent semiconductor apparatus products, such as SoCs, of increased size include many buses so as to increase performance, as well as include a significantly increased number of modules serving as bus masters. Even in these semiconductor integrated circuit apparatuses, it is easy in terms of hardware design to complete bus transactions issued by all modules serving as bus masters before stopping the bus of a module serving a bus slave, so as to prevent hang-up of the bus masters. In this case, however, the buses of a larger number of bus masters than necessary may be stopped. This would result in a reduction in performance of the entire semiconductor integrated circuit apparatus.

An advantage of the present invention is to provide a semiconductor integrated circuit apparatus that stops the buses of as few modules as possible and thus controls a reduction in performance.

The above-mentioned and other advantages and novel features of the present invention will be apparent from the description of this specification and the accompanying drawings.

A typical invention of the inventions disclosed in this application is briefly outlined as follows:

A semiconductor integrated circuit apparatus according to one embodiment of the present invention includes multiple modules serving as bus masters, a module serving as a bus slave, and a bus operation control unit that, when receiving a first control signal for requesting stop of use of a bus of the module serving as a bus slave, first stops a bus of a module serving as a bus master and then outputs to the module serving as a bus slave a signal for requesting stop of the bus.

The bus operation control unit determines a module serving as a bus master of the bus slave and outputs to the determined module a second control signal for requesting stop of a bus. When stop of the bus of the module serving as a bus master is complete, the bus operation control unit requests the module serving as a bus slave to stop a bus.

An effect obtained by a typical invention of the inventions disclosed in this application is briefly described as follows:

A reduction in processing capability caused by stop of the buses of modules can be controlled.

DESCRIPTION

Now, an embodiment of the present invention will be described in detail with reference to the accompanying drawings. The same components are basically given the same reference signs throughout the drawings for describing the embodiment and will not be described repeatedly.

Figure 1:
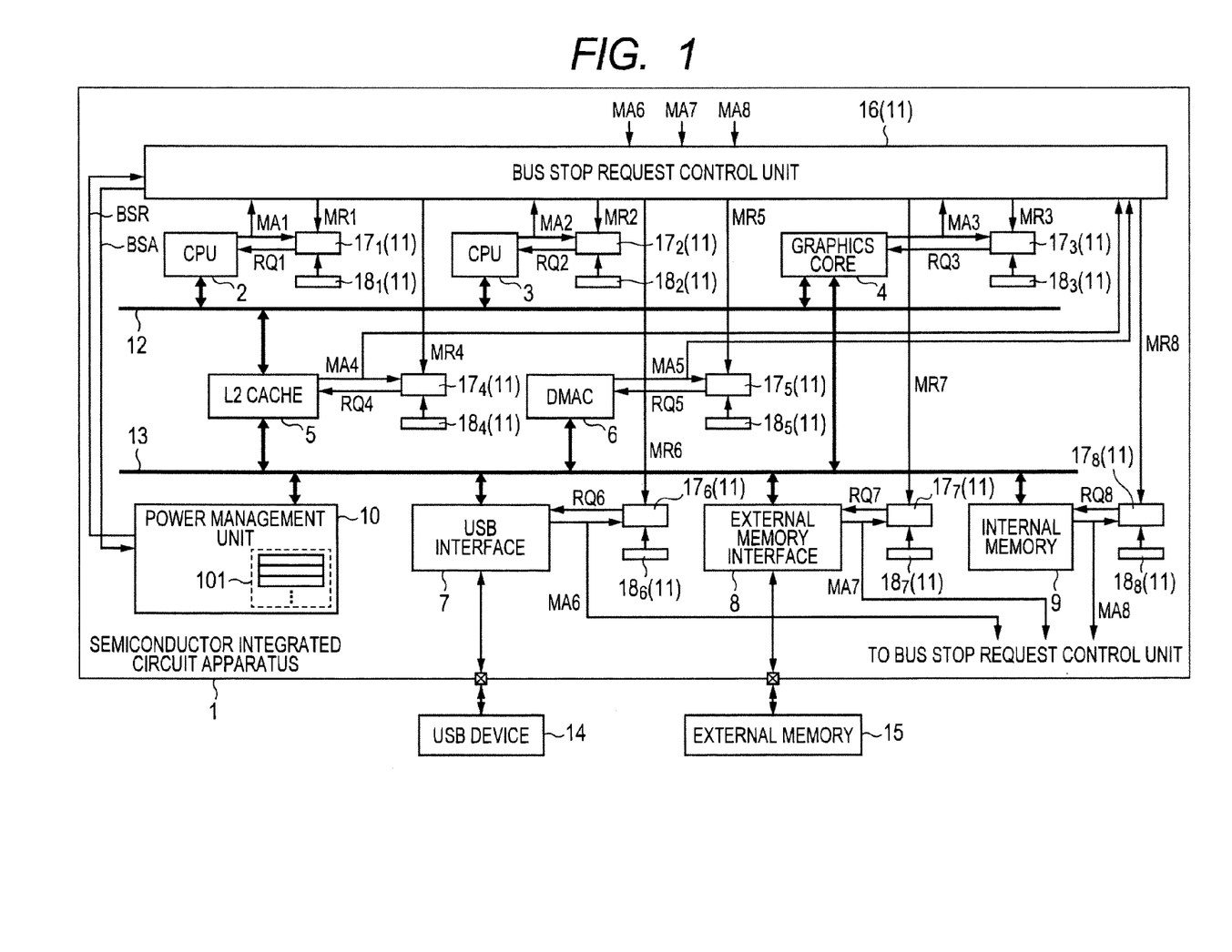
FIG. 1 is a block diagram showing an example configuration of a semiconductor integrated circuit according to an embodiment of the present invention.
Figure 2:
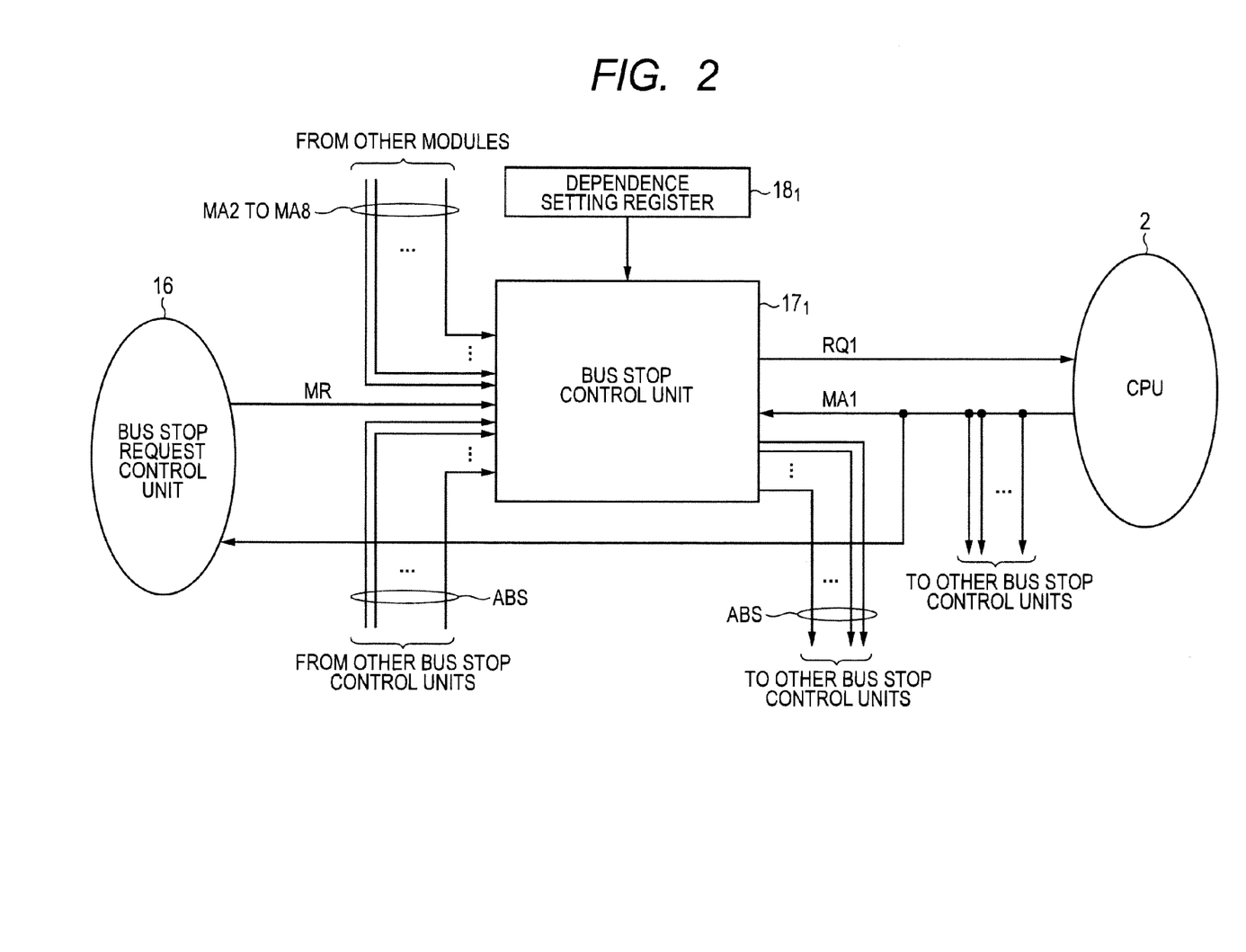
FIG. 2 is a diagram showing an example of coupling between a bus stop control unit corresponding to a CPU, and a dependence setting register included in the semiconductor integrated circuit apparatus of FIG. 1.
Figure 3:
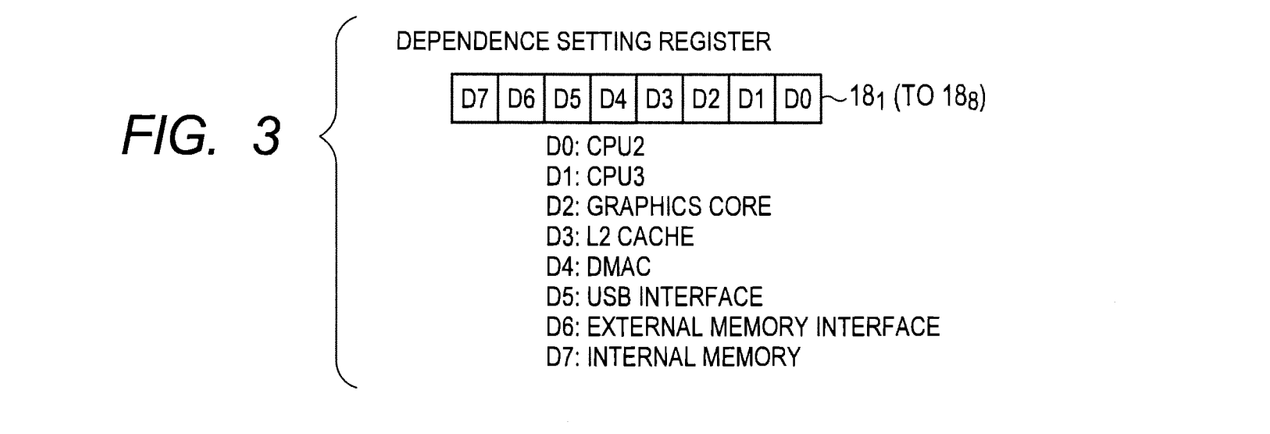
FIG. 3 is a diagram showing details of data in the dependence setting register included in the semiconductor integrated circuit apparatus of FIG. 1.
Figure 4:
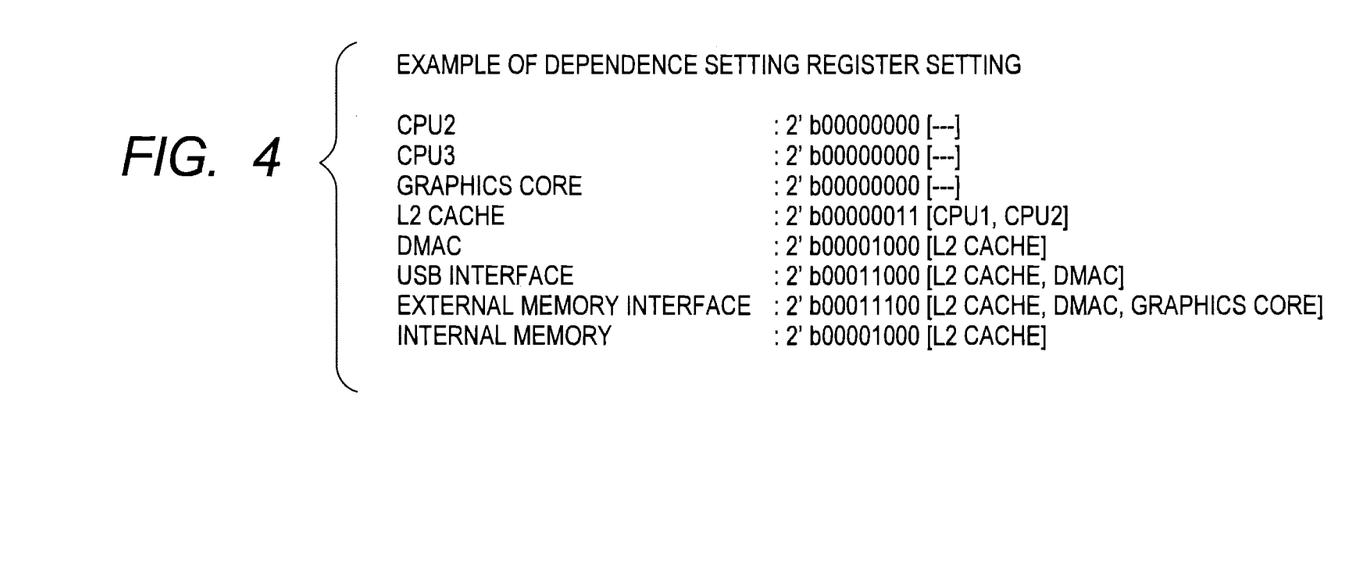
FIG. 4 is a diagram showing an example of register settings in the dependence setting register of FIG. 3.
Figure 5:
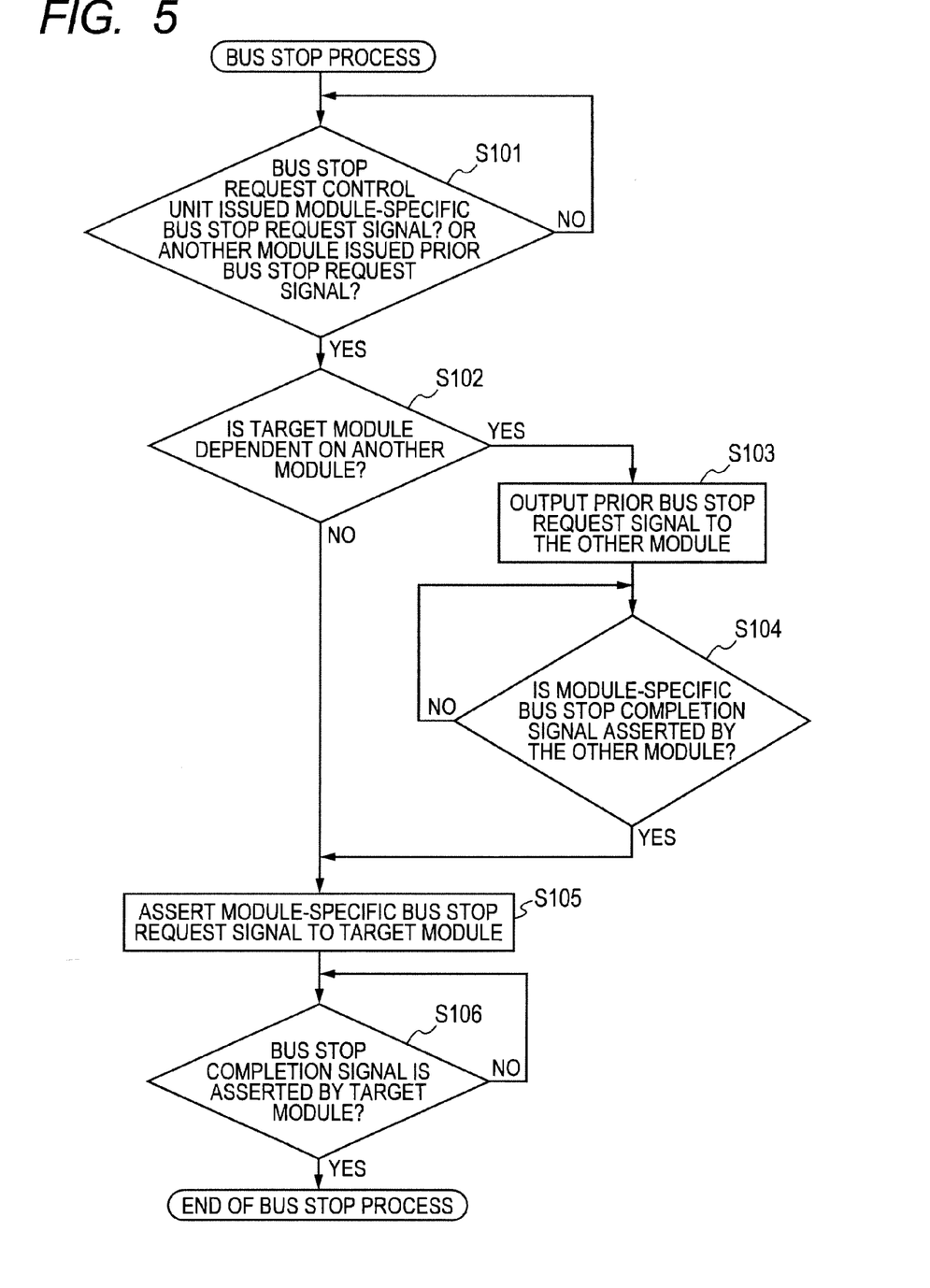
FIG. 5 is a flowchart showing an example of a bus stop process performed by the bus stop control unit included in the semiconductor integrated circuit apparatus of FIG. 1.
Figure 6:
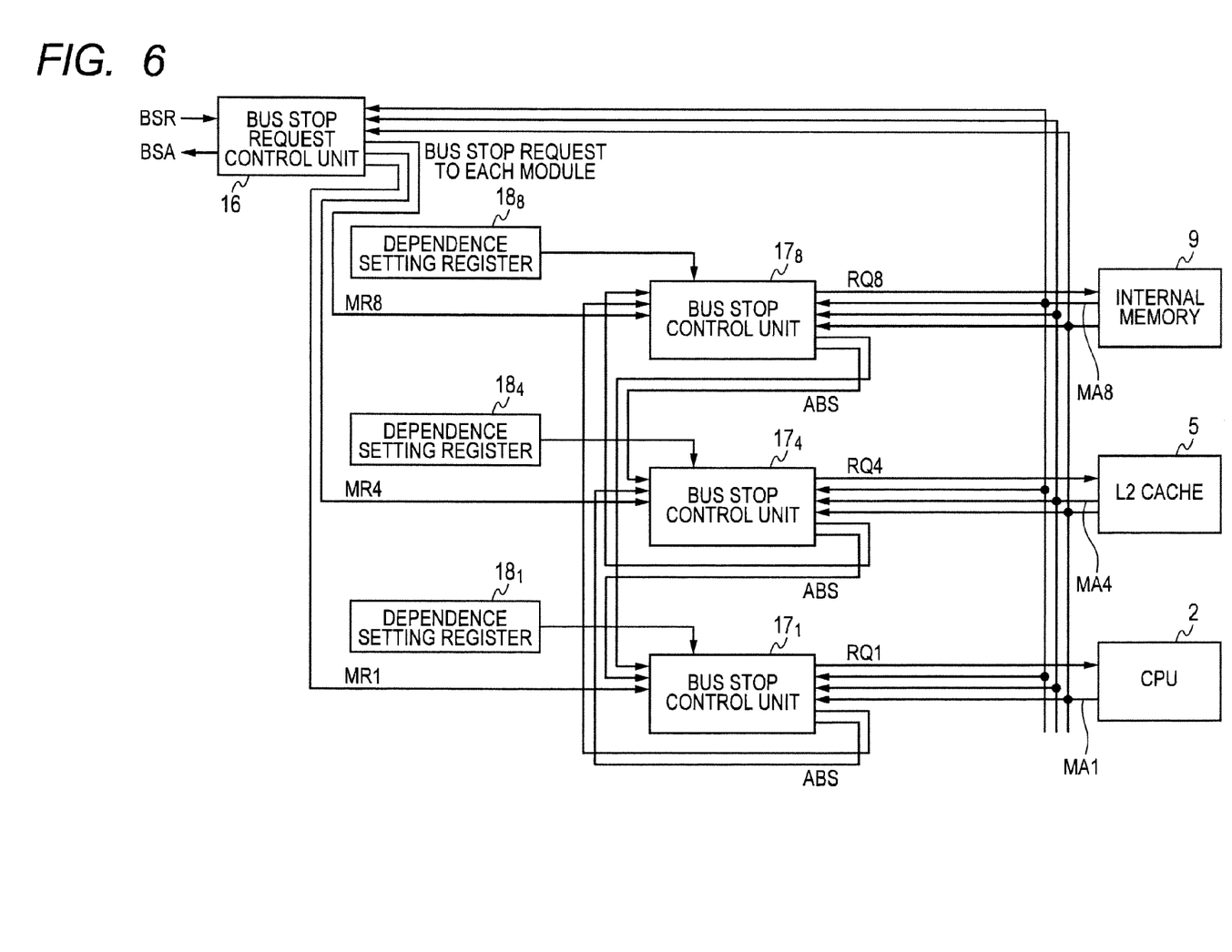
FIG. 6 is a diagram showing a bus stop process performed to change the operating clock frequency of an internal memory included in the semiconductor integrated circuit apparatus of FIG. 1.
Figure 7:
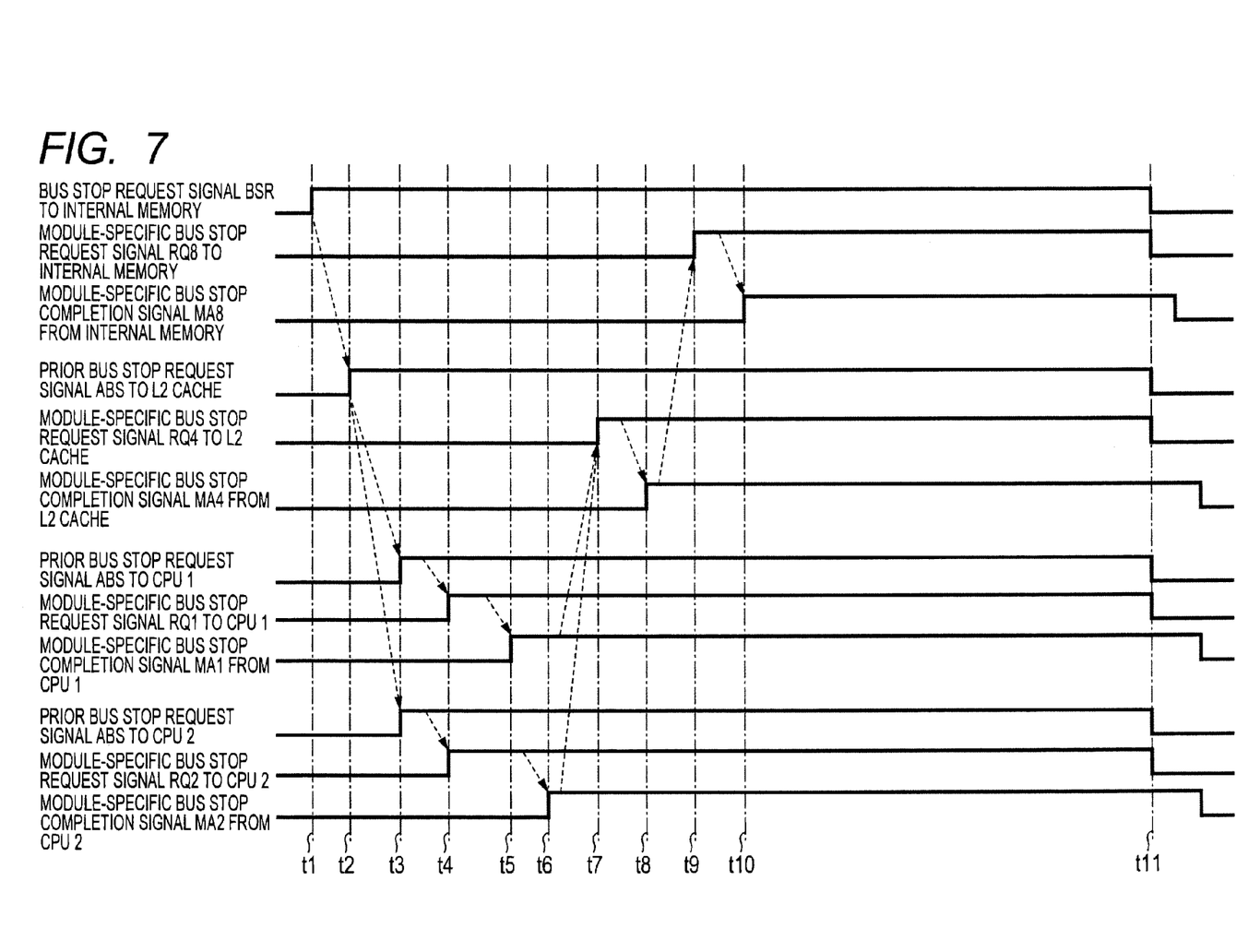
FIG. 7 is a timing chart showing the timings when the components of FIG. 6 output a signal.

FIG. 1 is a block diagram showing an example configuration of a semiconductor integrated circuit according to an embodiment of the present invention. FIG. 2 is a diagram showing an example of the coupling between a bus stop control unit corresponding to a CPU and a dependence setting register included in the semiconductor integrated circuit apparatus of FIG. 1. FIG. 3 is a diagram showing details of data stored in the dependence setting register included in the semiconductor integrated circuit apparatus of FIG. 1. FIG. 4 is a diagram showing an example of register settings made in the dependence setting register of FIG. 3. FIG. 5 is a flowchart showing an example of a bus stop process performed by the bus stop control unit included in the semiconductor integrated circuit apparatus of FIG. 1. FIG. 6 is a diagram showing a bus stop process performed to change the operating clock frequency of an internal memory included in the semiconductor integrated circuit apparatus of FIG. 1. FIG. 7 is a timing chart showing the timings when the components of FIG. 6 issue a signal.

Outline of Embodiment

The semiconductor integrated circuit apparatus according to this embodiment includes multiple modules (CPU2, CPU3, graphics core 4) serving as bus masters, multiple modules (L2 cache 5, direct memory access controller 6, USB interface 7, external memory interface 8, internal memory 9) serving as bus slaves, and multiple bus operation control units (bus stop control unit 17, dependence setting register 18).

Upon receipt of a first control signal (module-specific bus stop request signal MR) for stopping use of the bus of a module serving as a bus slave, the bus operation control units determine a module serving as the bus master of the bus slave from among the bus masters, outputs a second control signal for requesting stop of the bus (prior bus stop request signal ABS) to the determined module serving as a bus master, and, after stop of the bus of the module serving as a bus master completes, outputs a third control signal (module-specific bus stop request signal RQ) for requesting stop of the bus to the module serving as a bus slave.

Next, the embodiment will be described in detail based on the outline described above.

Configuration of Semiconductor Integrated Circuit Apparatus

In this embodiment, a semiconductor integrated circuit apparatus 1 constitutes, e.g., an SoC and is used, e.g., as a baseband IC of a cellular phone. As shown in FIG. 1, the semiconductor integrated circuit apparatus 1 includes the modules, including the central processing unit (CPU) 2, the CPU 3, the graphics core 4, the L2 cache 5, the direct memory access controller (DMAC) 6, the USB interface 7, the external memory interface 8, and the internal memory 9, a power management unit 10, and a bus control unit 11.

The CPU 2, the CPU 3, the graphics core 4, and the L2 cache 5 are coupled together via a high-speed core bus 12. The graphics core 4, the L2 cache 5, the direct memory access controller 6, the USB interface 7, the external memory interface 8, the internal memory 9, and the power management unit 10 are coupled together via a main bus 13.

The high-speed core bus 12 is a bus over which high-speed communications are possible, and the main bus 13 is a bus over which communications are performed at lower speed than over the high-speed core bus 12. Externally coupled to the semiconductor integrated circuit apparatus 1 via external terminals are peripheral devices, a universal serial bus (USB) device 14 and an external memory 15.

Accordingly, for the high-speed core bus 12, the L2 cache 5 is a module serving as a bus slave, and the CPU 2, the CPU 3, and the graphics core 4 are each a module serving as a bus master of the bus slave. With respect to the main bus 13, the USB interface 7, the external memory interface 8, and the internal memory 9 are modules serving as bus slaves, and the L2 cache 5, the direct memory access controller 6, and the graphics core 4 are modules serving as bus masters thereof. The direct memory access controller 6 also serves as a bus slave, and the L2 cache 5 and the graphics core 4 serve as bus masters thereof. The CPU 2, the CPU 3, the graphics core 4, the L2 cache 5, and the direct memory access controller 6 are each a module serving as a bus master. The L2 cache 5, the direct memory access controller 6, the USB interface 7, external memory interface 8, and the internal memory 9 are modules serving as bus slaves. The L2 cache 5 and the direct memory access controller 6 can be said to be modules serving as both a bus master and a bus slave.

The external memory 15 is composed of, for example, a volatile semiconductor memory such as a double data rate synchronous dynamic random access memory (DDR-SDRAM).

The CPU 2 and the CPU 3 operate in the semiconductor integrated circuit apparatus 1 on the basis of a user program. The graphics core 4 performs a two-dimensional or three-dimensional graphic process. The L2 cache 5 is used as a secondary cache for the CPUs 2 and 3 and stores data used by the CPU 2, the CPU 3, or the like. The CPUs 2 and 3 each have a primary cache.

The direct memory access controller 6 controls data write or data read by directly accessing the externally coupled external memory 15, the internal memory 9, or the like without passing through the CPU 2 or CPU 3.

The USB interface 7 is an interface circuit with the USB device 14, and the external memory interface 8 is an interface circuit with the external memory 15. The internal memory 9 is composed of, e.g., a nonvolatile memory, such as a flash memory or read only memory (ROM), or random access memory (RAM) and stores a user program or the like used by the CPU 2, the CPU 3, or the like.

The power management unit 10 controls power saving of the semiconductor integrated circuit apparatus 1. The power management unit 10 includes, for example, multiple control registers 101 associated with the modules serving as bus slaves, such as the USB interface 7, the external memory interface 8, and the internal memory 9, and controls power saving of the modules corresponding to the bus control unit 11 on the basis of information stored in the control registers.

Examples of power saving control performed by the power management unit 10 include stop of clock supply to a module, a change in the operating frequency (clock) of a module, and stop of power supply to a module. The power management unit 10 stops use of a bus of a module on which power saving is to be performed and selects the most suitable from among the three power saving control options and performs the selected option on the module.

The bus control unit 11 includes a bus stop request control unit 16, bus stop control units $17_1$ to $17_8$, and dependence setting registers $18_1$ to $18_8$. The bus stop control units $17_1$ to $17_8$ and the dependence setting registers $18_1$ to $18_8$ are disposed so as to correspond to the modules (CPU 2, CPU 3, graphics core 4, L2 cache 5, direct memory access controller 6, USB interface 7, external memory interface 8, internal memory 9) of the semiconductor integrated circuit apparatus 1.

Instead of disposing the dependence setting registers so as to correspond to all the modules, a configuration may be employed where they are disposed so as to correspond to the modules serving as bus slaves (L2 cache 5, direct memory access controller 6, USB interface 7, external memory interface 8, the internal memory 9 of FIG. 1) and they are not disposed so as to correspond to the modules serving as bus masters (CPU 2, CPU 3, graphics core 4).

The bus stop request control unit 16 is coupled to the power management unit 10 in such a manner that the bus stop request control unit 16 receives a bus stop request signal BSR outputted by the power management unit 10, as well as in such a manner that the power management unit 10 receives a bus stop completion signal BSA outputted by the bus stop request control unit 16.

The bus stop request signal BSR is a signal for requesting stop of the bus and includes information indicating which module is a target module whose bus is to be stopped. Based on the bus stop request signal BSR outputted by the power management unit 10, the bus stop request control unit 16 performs bus stop control on the target module.

The bus stop completion signal BSA is a signal that the bus stop request control unit 16 issues when stopping use of the bus of the target module. Upon receipt of the bus stop completion signal BSA, the power management unit 10 determines that the bus of the target module has stopped and performs the above-mentioned power saving control option (one of stop of clock supply to a module, a change in the operating frequency of a module, and stop of power supply to a module) on the target module.

The bus stop control units $17_1$ to $17_8$ are coupled to the bus stop request control unit 16 so as to receive module-specific bus stop request signals MR1 to MR8, respectively, outputted by the bus stop request control unit 16. The modules (CPU 2, CPU 3, graphics core 4, L2 cache 5, direct memory access controller 6, USB interface 7, external memory interface 8, internal memory 9) are coupled to the bus stop request control unit 16 and the bus stop control units $17_1$ to $17_8$ in such a manner that module-specific bus stop completion signals MA1 to MA8 outputted by these modules are inputted to the bus stop request control unit 16, as well as to the bus stop control units $17_1$ to $17_8$, respectively.

Note that these modules are coupled to the bus stop control units $17_1$ to $17_8$ in such a manner that a module-specific bus stop completion signal is inputted not only to a bus stop control unit coupled to the target module but also to the other bus stop control units. Such coupling is omitted for simplification in FIG. 1. For example, the module-specific bus stop completion signal MA1 is inputted not only to the bus stop request control unit 16 and the bus stop control unit $17_1$ but also to the bus stop control units $17_2$ to $17_8$.

Further, the modules (CPU 2, CPU 3, graphics core 4, L2 cache 5, direct memory access controller 6, USB interface 7, external memory interface 8, internal memory 9) are coupled to the bus stop control units $17_1$ to $17_8$ so as to receive module-specific bus stop request signals RQ1 to RQ8, respectively, outputted by the bus stop control units $17_1$ to $17_8$.

The module-specific bus stop request signals MR1 to MR8 are signals for requesting a module whose bus is to be stopped to stop the bus. The module-specific bus stop completion signals MA1 to MA8 are signals indicating that processing of stop of the bus of a target module determined by the bus stop request control unit 16 is complete.

The module-specific bus stop request signals RQ1 to RQ8 are signals for stopping the bus of the corresponding module on the basis of the module-specific bus stop request signals MR1 to MR8, respectively, outputted by the bus stop request control unit 16.

The bus stop control units $17_1$ to $17_8$ are coupled together in such a manner that each bus stop control unit receives prior bus stop request signals ABS outputted by the other bus stop control units. This configuration is omitted for simplicity in FIG. 1.

For example, the bus stop control unit $17_1$ outputs prior bus stop request signals ABS to the other bus stop control units, $17_2$ to $17_8$, as well as receives prior bus stop request signals ABS outputted by the other bus stop control units, $17_2$ to $17_8$.

A prior bus stop request signal ABS includes information as to which module is a module on which the target module is dependent. It is a signal for stopping the bus of the module on which the target module is dependent, in advance of the target module.

"Dependence" means a correspondence of the target module designated by the bus stop request control unit 16 to another module accessing the target module. The target module serves as a bus slave and the other module accessing the target module serves as a bus master.

Example of Coupling Between Bus Stop Control Unit and Dependence Setting Register FIG. 2 is a diagram showing an example of coupling between the bus stop control unit $17_1$ corresponding to the CPU 2 and the dependence setting register $18_1$.

As shown, the dependence setting register $18_1$ is coupled to the bus stop control unit $17_1$. The bus stop request control unit $17_1$ receives module-specific bus stop completion signals MA2 to MA8 outputted by the other modules (CPU 3, graphics core 4, L2 cache 5, direct memory access controller 6, USB interface 7, external memory interface 8, internal memory 9).

The bus stop control unit $17_1$ is also coupled to the bus stop request control unit 16 and the bus stop control units $17_2$ to $17_8$ in such a manner that the module-specific bus stop completion signal MA1 outputted by the CPU 2 is inputted to the bus stop request control unit 16 and the bus stop control units $17_2$ to $17_8$. Further, the bus stop control unit $17_1$ is coupled to the CPU 2 in such a manner that a module-specific bus stop request signal RQ1 outputted by the bus stop control unit $17_1$ is inputted to the CPU 2.

The bus stop control unit $17_1$ and the other bus stop control units, $17_2$ to $17_8$, are coupled together in such a manner that a prior bus stop request signal ABS outputted by the bus stop control unit $17_1$ is inputted to each of the other bus stop control units, $17_2$ to $17_8$, and in such a manner that prior bus stop request signals ABS outputted by the other bus stop control units, $17_2$ to $17_8$, are inputted to the bus stop control unit $17_1$.

Assuming that the module is the CPU 2, the example of coupling between the bus stop control unit $17_1$ and the dependence setting register $18_1$ has been described with reference to FIG. 2. The same goes for the coupling between the bus stop control units $17_2$ to $17_8$ corresponding to the other modules (CPU 3, graphics core 4, L2 cache 5, direct memory access controller (DMAC) 6, USB interface 7, external memory interface 8, internal memory 9) and the dependence setting registers $18_2$ to $18_8$.

Details of Data in Dependence Setting Register and Example of Data Configuration FIG. 3 is a diagram showing details of data in a dependence setting register $18_1$ ($18_2$ to $18_8$). FIG. 4 is a diagram showing an example of register settings in a dependence setting register $18_1$ ($18_2$ to $18_8$).

The dependence setting register $18_1$ ($18_2$ to $18_8$) holds, for example, a total of 8 bits of data registers D0 to D7. The data register D0 corresponds to the CPU 2; the data register D2 the graphics core 4; the data register D3 the L2 cache 5; the data register D4 the direct memory access controller 6; the data register D5 the USB interface 7; the data register D6 the external memory interface 8; and the data register D7 the internal memory 9. If a module is dependent on another module, "1" is stored in a data register corresponding to the other module.

Information indicating dependence is stored only in the data registers corresponding to the modules (L2 cache 5, direct memory access controller 6, USB interface 7, external memory interface 8, internal memory 9) serving as bus slaves. Information "0" is stored in any of the data registers D0 to D7 of each of the dependence setting registers $18_1$ to $18_3$ corresponding to the modules (CPU 2, CPU 3, and graphics core 4) that serve as bus masters and that have no dependence.

For example, in the dependence setting register $18_6$ coupled to the USB interface 7, "1" is stored in the data registers D3 and D4, as shown in FIG. 4. This means that the USB interface 7 is dependent on the L2 cache 5 and the direct memory access controller 6. In other words, the L2 cache 5 and the direct memory access controller 6 are bus masters of the USB interface 7 serving as a bus slave.

The bus slaves (L2 cache 5, direct memory access controller 6, USB interface 7, external memory interface 8, and internal memory 9) do not need to be dependent on all bus masters accessible to the bus slaves. For example, while the L2 cache 5, the direct memory access controller 6, and the graphics core 4 are bus masters accessible to the USB interface 7, only the L2 cache 5 and the direct memory access controller 6 are bus masters determined by the dependence setting register 186.

The dependence setting registers $18_1$ to $18_8$ are each composed of a volatile memory device. The CPU 2, the CPU 3, or both writes information indicating dependence to these dependence setting registers. Information indicating dependence is set in the dependence setting registers, for example, in making initial settings when turning on the semiconductor integrated circuit device 1. The dependence setting registers may be each composed of a nonvolatile memory device.

Information stored in the dependence registers may be always fixed during operation of the semiconductor integrated circuit apparatus 1 or may be dynamically rewritten by software in accordance with the operation state (operation scene) of the semiconductor integrated circuit apparatus 1. As a result, more precise bus stop control can be performed on the modules, improving the performance of the semiconductor integrated circuit apparatus 1.

Example Process Perform by Bus Control Unit

Next, a process performed by the bus control unit 11 according to this embodiment will be described.

FIG. 5 is a flowchart showing an example of a bus stop process performed by a bus stop control unit ($17_1$ to $17_8$).

The bus stop control unit ($17_1$ to $17_8$) determines whether the bus stop request control unit 16 has issued a module-specific bus stop request signal (MR1 to MR8) or determines whether another bus stop control unit ($17_1$ to $17_8$) has issued a prior bus stop request signal ABS (step S101).

When one of a module-specific bus stop request signal (MR1 to MR8) and a prior bus stop request signal ABS has been issued, a bus stop control unit ($17_1$ to $17_8$) coupled to a target module whose bus is to be stopped reads information stored in a corresponding dependence setting register $18_1$ ($18_2$ to $18_8$) and determines whether the target module (L2 cache 5, direct memory access controller 6, automatic position controller 76, external memory interface 8, internal memory 9) is dependent on another module (step S102).

If the target module is dependent on another module, a bus stop control unit corresponding to the target module outputs a prior bus stop request signal ABS to a bus stop control unit corresponding to the other module (step S103). For example, the internal memory 9 is dependent on only the L2 cache 5, as shown in FIG. 4. Accordingly, the bus stop control unit $17_8$ coupled to the internal memory 9 outputs a prior bus stop request signal ABS to the bus stop control unit $17_4$ coupled to the L2 cache 5.

As described above, the prior bus stop request signal ABS is intended to stop the bus of the module on which the module requested to stop the bus by the bus stop request control unit 16 is dependent, in advance of the requested module.

The bus stop control unit that has received the prior bus stop request signal ABS performs bus stop control on the module coupled thereto. When completing stop of the bus of this module, the bus stop control unit outputs a module-specific bus stop completion signal MA.

Upon receipt of the module-specific bus stop completion signal MA (step S104), the bus stop control unit that has outputted the prior bus stop request signal ABS asserts a module-specific bus stop request RQ to the module which is coupled to this bus stop control unit and whose bus is to be stopped (step S105).

The module whose bus is to be stopped stops use of the bus in accordance with the asserted module-specific bus stop request signal RQ. At this time, the entire module may stop operating or part of the module may be operating as long as use of the bus is stopped. In particular, a module serving as a bus master first completes bus transactions issued thereby and then stops use of the bus. After stopping the bus, the module outputs a module-specific bus stop completion signal MA (step S106). If the module has already stopped the bus when the module-specific bus stop request signal RQ is asserted, it may output a module-specific bus stop completion signal MA without performing a substantial process.

In this way, the process of stopping the bus of the module is completed.

In the case of the internal memory 9, the L2 cache 5 stops operating in accordance with the prior bus stop request signal ABS received by the bus stop control unit 174, and then the bus stop control unit $17_4$ outputs the module-specific bus stop completion signal indicating that the L2 cache 5 has stopped the bus.

Upon receipt of the module-specific bus stop completion signal, the bus stop control unit $17_8$ outputs the module-specific bus stop request signal RQ8 to the internal memory 9. Thus, the internal memory 9 stops operating and outputs the module-specific bus stop completion signal MA. When the bus stop request control unit 16 recognizes that the internal memory 9 has stopped the bus, the bus stop process completes.

As seen, when the module (bus slave) requested to stop the bus by the bus stop request control unit 16 is dependent on another module (bus master), the bus stop control units $17_1$ to $17_8$ first stop the bus of the other module and then performs bus stop control on the requested dependent module.

Thus, the module serving as a bus slave is prevented from stopping use of the bus, for example, immediately after the module serving as a bus master issues a bus request to the module serving as a bus slave. As a result, such as hang-up that occurs when the module serving as a bus master continues waiting for a response from the module serving as a bus slave can be prevented.

Further, modules whose bus is to be stopped are determined before the module serving as a bus slave starts to perform a bus stop process, and the process of stopping the bus of only the determined bus masters is performed. As a result, more bus masters than necessary are prevented from stopping the bus. In particular, bus masters whose bus is to be stopped are determined based on information stored in writable storage devices (volatile memories or nonvolatile memories). As a result, bus masters whose bus is to be stopped can be changed as necessary.

Bus Stop Control in Bus Control when Performing Power Saving Control

Next, details of a bus stop control process performed by the bus control unit 11 will be described.

Semiconductor integrated circuit apparatuses, particularly those having a complicated bus configuration such as hierarchized buses include modules serving as both a bus master and a bus slave. For example, in FIG. 1, the L2 cache 5 and the direct memory access controller 6 are such modules. For a module serving as a bus master (first module) to complete a bus request issued thereby, a module serving as both a bus master and a bus slave (second module) may need to additionally issue a bus request. If the bus stop control unit issues a bus stop request and then the second module completes stop of the bus in advance of the first module, the first module would continue to wait for a response from the second module. This would prevent completion of bus stop control on the first module, which may cause hang-up of the semiconductor integrated circuit apparatus.

What is commonly practiced to avoid such hang-up is to identify conditions that cause such hang-up and then design software (program) in such a manner that bus stop control is performed in an order that does not cause hang-up. A problems here, however, is that designing software such that bus stop control is performed as described above requires many man-hours, increasing development cost. Further, designing products having different bus configurations requires review of the conditions that cause hang-up and modification of the software that performs bus stop control.

This embodiment provides a hardware configuration that even when there are modules serving as both a bus master and a bus slave, modules stop the bus in a proper order. Hereafter, bus stop control performed by modules in a case where there are modules serving as both a bus master and a bus slave will be described.

Specifically, a bus stop process that the power management unit 10 in FIG. 1 performs to change the operating clock frequency of the internal memory 9 in order to perform power saving control will be described.

FIG. 6 is a diagram showing a bus stop process performed to change the operating clock frequency of the internal memory 9. FIG. 7 is a timing chart showing the timings when the components of FIG. 6 output a signal.

FIG. 6 shows only blocks related to the bus stop process performed to change the operating clock frequency of the internal memory 9. This diagram is obtained by extracting only the coupling between the bus stop request control unit 16, the bus stop control units $17_8$, $17_4$, and $17_1$, the dependence setting registers $18_8$, $18_4$, and $18_1$, the internal memory 9, the L2 cache 5, and the CPU 2 from FIG. 1.

While FIG. 4 shows that the L2 cache 5 is dependent on the CPU 2 and CPU3, the coupling between the L2 cache 5 and the CPU 3 is the same as that between the L2 cache 5 and the CPU 2. Accordingly, the CPU 3, the bus stop control unit $17_2$, and the dependence setting register $18_2$ are omitted in FIG. 6.

FIG. 7 shows the following signal output timings from top to bottom: the timing when the power management unit 10 (FIG. 1) issues a bus stop request signal BSR; the timing when the bus stop control unit $17_8$ outputs a module-specific bus stop request signal RQ8; the timing when the internal memory 9 outputs a module-specific bus stop completion signal MA8; the timing when the bus stop control unit $17_4$ outputs a prior bus stop request signal ABS; the timing when the bus stop control unit $17_4$ outputs a module-specific bus stop request signal RQ4; the timing when the L2 cache 5 outputs a module-specific bus stop completion signal MA4; the timing when the bus stop control unit $17_1$ outputs a prior bus stop request signal ABS; the timing when the bus stop control unit $17_1$ outputs a module-specific bus stop request signal RQ1; the timing when the CPU 2 outputs a module-specific bus stop completion signal MA1; the timing when the bus stop control unit $17_2$ outputs a prior bus stop request signal ABS; the timing when the bus stop control unit $17_2$ outputs a module-specific bus stop request signal RQ2; and the timing when the CPU 3 outputs a module-specific bus stop completion signal MA2.

To change the operating clock frequency of the internal memory 9 to perform power saving control, first, the power management unit 10 outputs a bus stop request signal BSR for requesting the internal memory 9 to stop the bus (time t1 in FIG. 7).

Upon receipt of the bus stop request signal BSR, the bus stop request control unit 16 outputs to the bus stop control unit 178 a module-specific bus stop request signal MR8 for requesting the internal memory 9 to stop the bus. Upon receipt of the module-specific bus stop request signal MR8, the bus stop control unit $17_8$ reads information in the dependence setting register $18_8$ and determines whether there is a module on which the internal memory 9 is dependent (a module serving as a bus master of the internal memory 9).

Since FIG. 4 shows that the internal memory 9 is dependent on the L2 cache 5, the bus stop control unit $17_8$ outputs a prior bus stop request signal ABS to the bus stop control unit $17_4$ (time t2 in FIG. 7). Upon receipt of the prior bus stop request signal ABS, the bus stop control unit $17_4$ reads information in the dependence setting register $18_4$ and determines whether there is a module on which the L2 cache 5 is dependent (a module serving as a bus master of the L2 cache 5).

Since FIG. 4 shows that the L2 cache 5 is dependent on the CPU 2 and CPU 3, the bus stop control unit 174 outputs a prior bus stop request signal ABS to each of the bus stop control unit $17_1$ and the bus stop control unit $17_2$ (not shown) (time t3 in FIG. 7).

Upon receipt of the prior bus stop request signals ABS, the bus stop control units $17_1$ and $17_2$ read information in the dependence setting registers $18_1$ and $18_2$, respectively, and determine whether there is a module on which the CPU 2 or CPU 3 is dependent.

Since information indicating dependence is not stored in any of the dependence setting registers $18_1$ and $18_2$ corresponding to the CPUs 2 and 3, the process of reading information in the dependence setting registers $18_1$ and $18_2$ may be omitted.

Since FIG. 4 shows that there is no module on which the CPU 2 or CPU 3 is dependent, the bus stop control units $17_1$ and $17_2$ output module-specific bus stop request signals RQ1 and RQ2 for requesting stop of the bus to the CPUs 2 and 3, respectively (time t4 in FIG. 7).

Upon receipt of the module-specific bus stop request signals RQ1 and RQ2, the CPUs 2 and 3 stop the bus and output module-specific bus stop completion signals MA1 and MA2 indicating that processing of stop of the bus is complete, to the bus stop control units $17_1$ and $17_2$, respectively (times t5 and t6 in FIG. 7).

The module-specific bus stop completion signals MA1 to MA8 are also outputted to the bus stop control unit $17_4$. Thus, the bus stop control unit $17_4$ determines that the CPUs 2 and 3, on which the L2 cache 5 is dependent, have completed stop of the bus and outputs a module-specific bus stop request signal RQ4 to the L2 cache 5 (time t7 in FIG. 7).

Upon receipt of the module-specific bus stop request signal RQ4, the L2 cache 5 stops the bus and outputs a module-specific bus stop completion signal MA4 indicating that processing of stop of the bus is complete (time t8 in FIG. 7).

The module-specific bus stop completion signal MA4 is outputted to the bus stop control unit $17_4$, as well as to the bus stop control unit $17_8$. The bus stop control unit $17_8$ determines that the L2 cache 5, on which the internal memory 9 is dependent, has stopped the bus and outputs a module-specific bus stop request signal RQ8 to the internal memory 9 (time t9 in FIG. 7).

Upon receipt of the module-specific bus stop request signal RQ8, the internal memory 9 stops the bus and outputs a module-specific bus stop completion signal MA8 indicating that processing of stop of the bus is complete (time t10 in FIG. 7).

The module-specific bus stop completion signal MA8 outputted by the internal memory 9 is inputted to the bus stop request control unit 16. Thus, the bus stop request control unit 16 determines that stop of the bus of the internal memory 9 is complete and outputs a bus stop completion signal BSA to the power management unit 10.

Upon receipt of the bus top completion signal BSA, the power management unit 10 performs control so as to change the operating clock frequency of the internal memory 9 and then cancels the bus stop request signal BSR (time t11 in FIG. 7). In this way, the process of stopping the bus to change the operating clock frequency of the internal memory 9 is performed.

According to this embodiment, only the modules necessary for power saving control are allowed to stop the bus. As a result, hang-up or the like caused by the bus stop process can be avoided, improving the performance of the semiconductor integrated circuit apparatus 1.

Further, the need for a software process to avoid the hang-up conditions is eliminated. As a result, the man-hours for developing the semiconductor integrated circuit apparatus 1 and the cost thereof can be reduced.

While the present invention has been described in detail based on the embodiment, the invention is not limited thereto. As a matter of course, various changes can be made to the embodiment without departing from the spirit and scope of the invention.

What is claimed is:

1. A semiconductor integrated circuit apparatus comprising: a plurality of modules serving as bus masters;
a module serving as a bus slave; and
a bus operation control unit that, when receiving a first control signal for stopping use of a bus of the module serving as a bus slave, determines a first module serving as a bus master of the bus slave from among the modules serving as bus masters, outputs to the determined first module a second control signal for requesting stop of the bus, and after the stop of the bus by the first module is complete, outputs to the module serving as a bus slave a third control signal for requesting stop of the bus.

2. A semiconductor integrated circuit apparatus comprising:
a plurality of modules serving as bus masters;
a module serving as a bus slave;
a storage unit that stores information for determining at least one module from among the modules serving as bus masters; and a bus operation control unit that, when receiving a first control signal for stopping use of a bus of the module serving as a bus slave, outputs a second control signal for requesting stop of a bus, to at least one module determined based on the information stored in the storage unit and, after receiving a signal indicating that stop of the bus is complete from all of the determined at least one module, outputs to the module serving as a bus slave a third control signal for requesting stop of the bus.

3. The semiconductor integrated circuit apparatus according to claim 2, wherein
the modules serving as bus masters include a module that writes information to be stored in the storage unit, to the storage unit.

4. The semiconductor integrated circuit apparatus according to claim 1, further comprising:
a power control unit that performs power saving control on the module serving as a bus slave; and
a bus stop request control unit that outputs the first control signal in accordance with a control signal outputted by the power control unit and, when stop of the bus of the module serving as a bus slave is complete in accordance with the first control signal, outputs a bus stop completion signal indicating that processing of stop of the bus of the module serving as a bus slave is complete, to the power control unit, wherein
upon receipt of the bus stop completion signal from the bus stop request control unit, the power control unit performs power saving control on the module serving as a bus slave.

5. A semiconductor integrated circuit apparatus comprising:
a plurality of first modules serving as bus masters; a plurality of second modules serving as bus slaves; a plurality of first bus stop control units disposed so as to correspond to the first modules and configured to request stop of a bus to the corresponding first modules in accordance with a first bus stop request signal;
a plurality of second bus stop control units disposed so as to correspond to the second modules and configured to request stop of a bus to the corresponding second modules in accordance with a second bus stop request signal; and
a plurality of storage units coupled to the second bus stop control units, respectively, and configured to store information for determining at least one first module from among the first modules, wherein
upon receipt of the second bus stop request signal, each of the second bus stop control units outputs the first bus stop request signal to a first bus stop control unit corresponding to a first module determined based on information in a storage unit coupled to the second bus stop control unit and, upon receipt of a bus stop completion signal indicating that processing of stop of the bus of the determined first module is complete, from the first bus stop control unit, requests a second module corresponding to the second bus stop control unit to stop a bus.

6. The semiconductor integrated circuit apparatus according to claim 5,
wherein a third module of the first modules and a fourth module of the second modules are common, and
wherein the bus stop control unit corresponding to the fourth module receives the first bus stop request signal from the first bus stop control unit corresponding to a fifth module different from the common module of the modules serving as bus slaves.

7. The semiconductor integrated circuit apparatus according to claim 5, wherein the modules serving as bus masters include a module that writes information to be stored in the storage units, to the storage units.

8. The semiconductor integrated circuit apparatus according to claim 5, further comprising:
   a plurality of other storage units coupled to the first bus stop control units and configured to store information for determining at least one first module from among the first modules,
   wherein each of the first bus stop control units outputs the first bus stop request signal to a corresponding first module on the basis of information stored in a storage unit coupled to the first bus stop control unit, and
   wherein at least one of the other storage units stores information that determines no first module from among the first modules.

9. The semiconductor integrated circuit apparatus according to claim 5, further comprising:
   a power control unit that at least performs power control on the modules serving as bus slaves; and
   a bus stop request control unit that outputs the second bus stop request signals to the second bus stop control units in accordance with a power control signal outputted by the power control unit and, when stop of a bus of a predetermined module is completed, outputs a bus stop completion signal to the power control unit,
   wherein upon receipt of the bus stop completion signal from the bus stop request control unit, the power control unit performs power saving control on the predetermined module.

* * * * *